United States Patent
Yamamoto et al.

(10) Patent No.: US 7,289,396 B2
(45) Date of Patent: Oct. 30, 2007

(54) DISK DEVICE

(75) Inventors: Seiichi Yamamoto, Kyoto (JP); Kenichi Niiyama, Kyoto (JP); Nobuo Nakamachi, Kyoto (JP); Yoshiki Tanaka, Kyoto (JP); Shinsuke Takagimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 684 days.

(21) Appl. No.: 10/778,078

(22) Filed: Feb. 17, 2004

(65) Prior Publication Data

US 2004/0165488 A1 Aug. 26, 2004

(30) Foreign Application Priority Data

Feb. 21, 2003 (JP) .............................. 2003-044100

(51) Int. Cl.
*G11B 7/00* (2006.01)
(52) U.S. Cl. .................................. 369/44.27; 369/44.25
(58) Field of Classification Search .................... None
See application file for complete search history.

(56) References Cited

U.S. PATENT DOCUMENTS 5,534,758 A * 7/1996 Yamamoto et al. ......... 318/112
6,282,162 B1 * 8/2001 Tobita et al. ............. 369/53.41
6,426,873 B1 * 7/2002 Minase et al. .............. 361/686

FOREIGN PATENT DOCUMENTS

JP 11-283309 10/1999
JP 2000-207807 A 7/2000

* cited by examiner

*Primary Examiner*—William Korzuch
*Assistant Examiner*—Tawfik Goma
(74) *Attorney, Agent, or Firm*—Arent Fox LLP

(57) ABSTRACT

A driver IC 1 has a bias terminal 20a via which a bias voltage fed from a microcomputer 2 to drive and control a loading motor 4 is fed in and a bias terminal 20b via which a bias voltage fed from a DSP 3 to drive and control a focus coil 5, a tracking coil 6, a sled motor 7, and a spindle motor 8 is fed in.

4 Claims, 4 Drawing Sheets

DISK DEVICE

This application is based on Japanese Patent Application No. 2003-044100 filed on Feb. 21, 2003, the contents of which are hereby incorporated by reference.

BACKGROUND OF THE INVENTION

1. Field of the Invention

The present invention relates to a disk apparatus for recording and reproducing data to and from an optical or magneto-optical disk, and more particularly to a disk apparatus provided with a driver IC for driving and controlling a data-position-specified driving mechanism for an optical pickup or the like and a loading mechanism.

2. Description of the Prior Art

Some conventional disk apparatuses for optical or magneto-optical disks are provided with an automatic loading mechanism that permits automatic loading, including swapping and ejection, of disks. Such disk apparatuses provided with an automatic loading mechanism include those which are designed to handle a plurality of disks, wherein one selected from among those disks is automatically transported to a reproducing mechanism by an automatic loading mechanism.

In such a disk apparatus wherein data is recorded to and reproduced from one selected from among a plurality of disks, when an instruction is given to eject a disk while data is being recorded to another disk, according to a conventionally proposed technique (see Japanese Patent Application Laid-Open No. H11-283309), the ejection operation is performed while no write operation is taking place. This helps to prevent an overlap between the ejection and write operations and thereby to reduce power consumption. A disk apparatus of this type is provided with a driver IC (integrated circuit) for controlling a transport mechanism at the time of disk loading, including disk swapping and ejection, and for controlling a spindle motor and a sled motor at the time of data recording and reproduction. This driver IC is configured as shown in FIG. 4.

The driver IC 100 shown in FIG. 4 is provided with: a loading driver 101 for controlling a loading motor 4 provided in a loading mechanism; a focus driver 102 for controlling the current that is fed to a focus coil 5 to move an objective lens 10a of an optical pickup 10 in a direction perpendicular to the disk surface of a disk 11; a tracking driver 103 for controlling the current that is fed to a tracking coil 6 to move the objective lens 10a of the optical pickup 10 in a direction radial to the disk 11; a sled driver 104 for driving and controlling a sled motor 7 that moves the optical pickup 10 in a direction radial to the disk 11 by using an intermediary transmission (not illustrated); and a spindle driver 105 for driving and controlling a spindle motor 8 that rotates the disk 11 in a direction circumferential thereto.

In an optical disk apparatus provided with the driver IC 100 configured as described above, a loading control signal, which indicates how to control the loading motor 4, is fed from a microcomputer 2, which controls the apparatus as a whole, via a signal input terminal 106 to the loading driver 101. Moreover, signals from the disk 11 are fed through the optical pickup 10 and an RF amplifier 9 to a DSP (digital signal processor) 3, which receives those signals as a tracking error signal and a focus error signal. The DSP 3 then controls operations for data recording and reproduction.

Moreover, a focus control signal, a tracking control signal, a sled control signal, and a spindle control signal indicating how to control the focus coil 5, tracking coil 6, sled motor 7, and spindle motor 8, respectively, are fed from the DSP 3 via signal input terminals 107 to 110 to the focus driver 102, tracking driver 103, sled driver 104, and spindle driver 105. Furthermore, a bias voltage is fed from the DSP 3 via a bias terminal 111 to the loading driver 101, focus driver 102, tracking driver 103, sled driver 104, and spindle driver 105.

In the driver IC 100 configured as shown in FIG. 4, however, when a loading operation is performed, whereas the focus driver 102, tracking driver 103, sled driver 104, and spindle driver 105, which receive the control signals from the DSP 3, are halted, the loading driver 101 needs to be kept operating with the bias voltage kept fed thereto. That is, to keep feeding the bias voltage to the loading driver 101, which receives the control signal from the microcomputer 2, the DSP 3 needs to be kept operating. This makes it necessary to keep supplying power to the DSP 3 even during a loading operation, and thus hampers reduction of power consumption.

SUMMARY OF THE INVENTION

An object of the present invention is to provide a disk apparatus that contributes to reducing power consumption.

To achieve the above object, according to one aspect of the present invention, a disk apparatus is provided with: a loading mechanism for transporting a disk having data stored thereon to a predetermined position; a data position specifying mechanism for specifying a data position in the data stored on the disk; a signal processor for processing a signal to control the data position specifying mechanism; a main controller for controlling the operation of the apparatus as a whole; and a driver. This driver is provided with: a loading controller for driving and controlling the loading mechanism; a data position specifying controller for driving and controlling the data position specifying mechanism; a first bias input terminal via which a bias voltage for operating the loading controller is fed in; a first signal input terminal via which a control signal fed from the main controller to the loading controller is fed in; a second bias input terminal via which a bias voltage for operating the data position specifying controller is fed in; and a second signal input terminal via which a control signal fed from the signal processor to the data position specifying controller is fed in. Here, when a loading operation is performed by operating the loading mechanism, whereas the main controller feeds the bias voltage to the first bias input terminal, the operation of the signal processor is halted.

According to another aspect of the present invention, a disk apparatus is provided with: a loading mechanism for transporting a disk having data stored thereon to a predetermined position; a data position specifying mechanism for specifying a data position in the data stored on the disk; a motor shared between the loading mechanism and the data position specifying mechanism so as to produce a driving force for driving the loading mechanism and the data position specifying mechanism; a signal processor for processing a signal to control the data position specifying mechanism; a main controller for controlling the operation of the apparatus as a whole; and a driver. This driver is provided with a motor controller for driving and controlling the motor; a data position specifying controller for driving and controlling a driving mechanism that is included in the data position specifying mechanism and that is driven by a driving force other than the driving force produced by the motor; a first signal input terminal via which a first control signal fed from the main controller to control the motor when the loading mechanism operates is fed in; a second signal input terminal via which a second control signal fed from the signal processor to control the motor when the data position specifying mechanism operates is fed in; a third signal input terminal via which a third control signal fed from the signal processor to the data position specifying controller is fed in; a control signal selector for selecting one of the first control signal fed in via the first signal input terminal and the second control signal fed in via the second signal input terminal and feeding the thus selected signal to the motor controller; and a selection control terminal via which a selection control signal is fed in by which the control signal selector is so controlled as to select the first control signal when the loading mechanism operates and the second control signal when the data position specifying mechanism operates.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
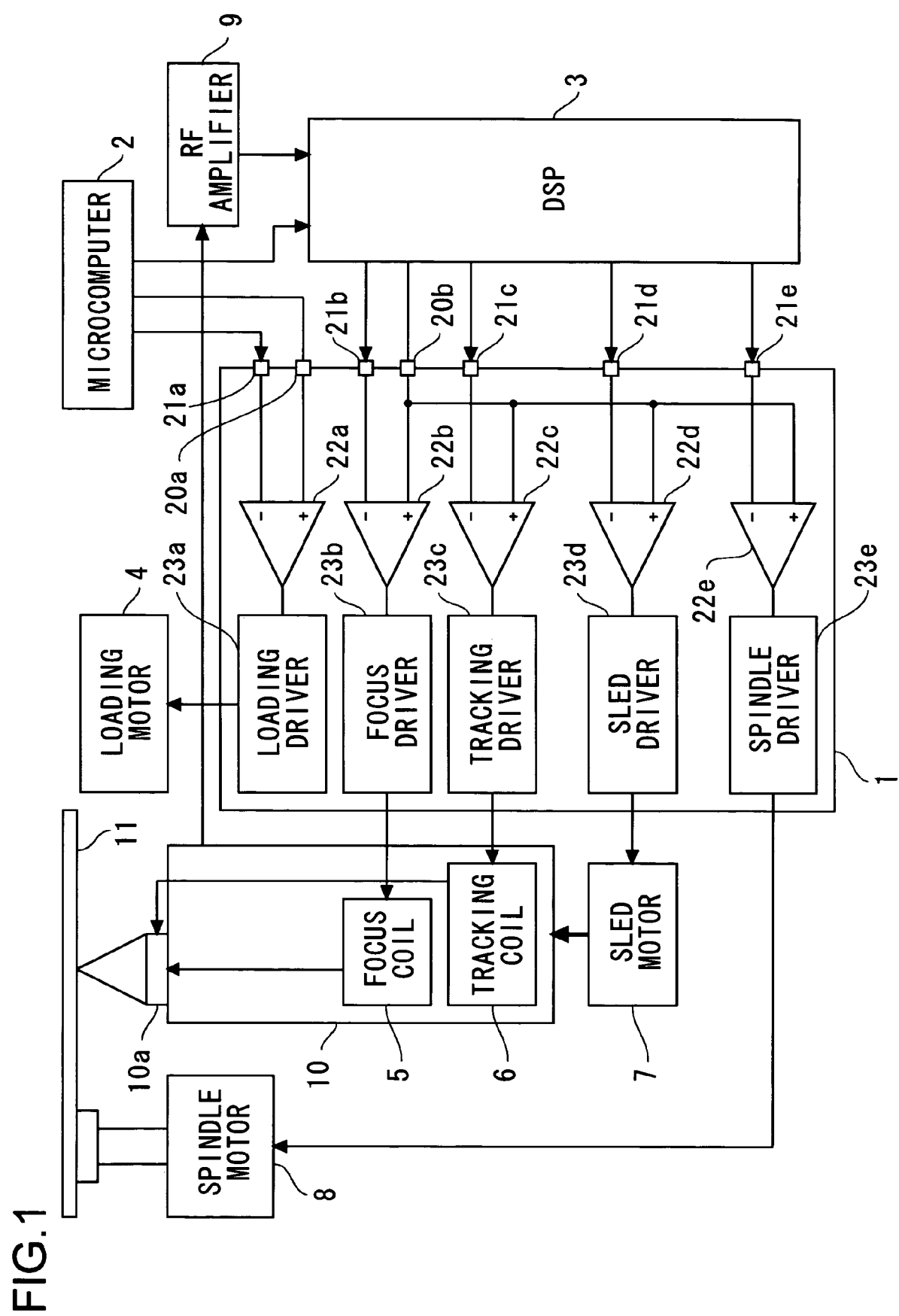
FIG. 1 is a block diagram showing the internal configuration of an optical disk apparatus provided with the driver IC of a first embodiment of the invention.
Figure 4:
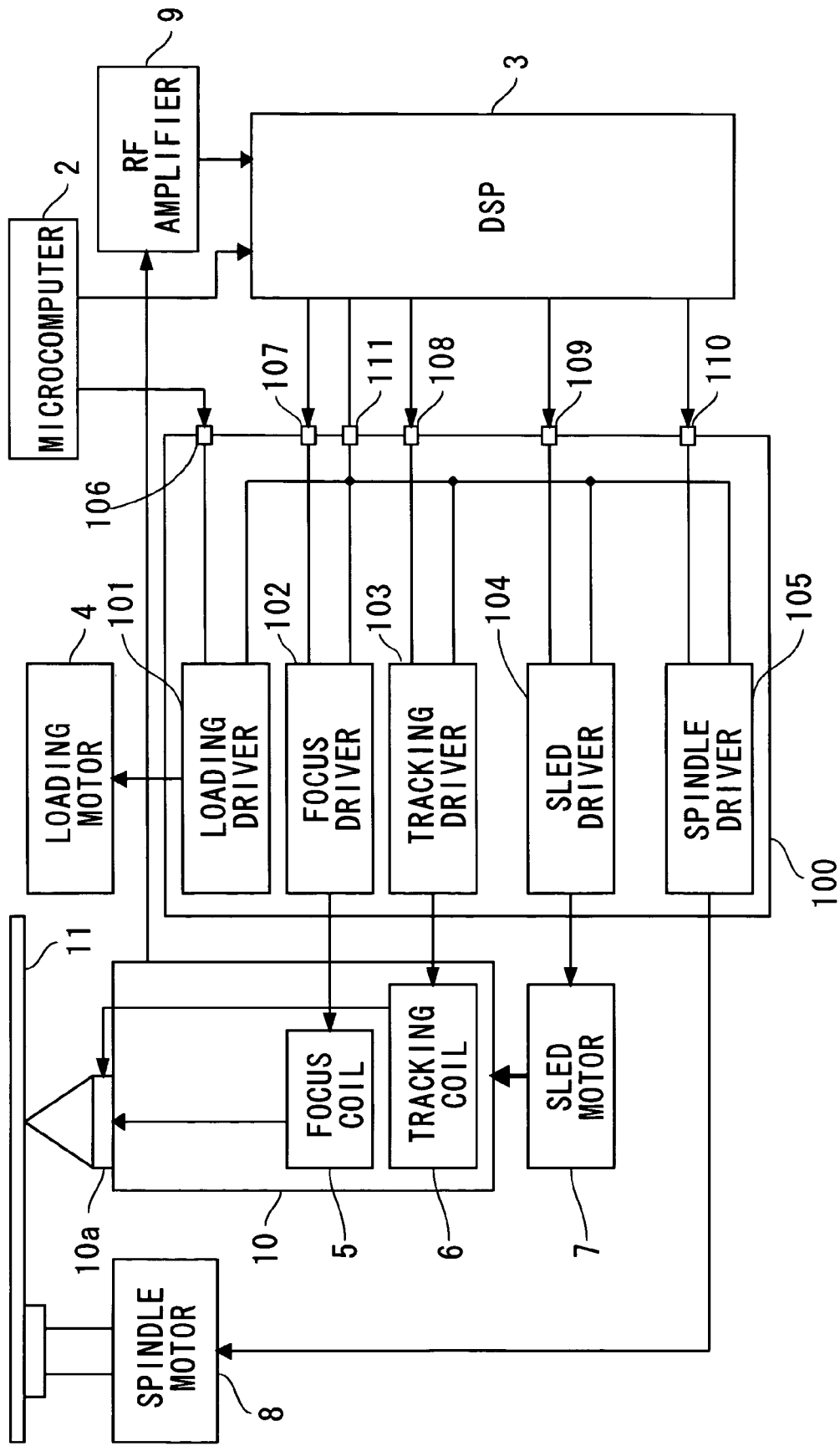
FIG. 4 is a block diagram showing the internal configuration of an optical disk apparatus provided with a conventional driver IC.

A first embodiment of the present invention will be described below with reference to the drawings. FIG. 1 is a block diagram showing the internal configuration of the optical disk apparatus of this embodiment. In the optical disk apparatus shown in FIG. 1, such components as are found also in the optical disk apparatus shown in FIG. 4 are identified with the same reference numerals.

The optical disk apparatus shown in FIG. 1 is provided with a driver IC 1, and this driver IC 1 is provided with: a bias terminal 20a via which a bias voltage fed from a microcomputer 2 when a loading operation is performed is fed in; a bias terminal 20b via which a bias voltage fed from a DSP 3 when a recording or reproducing operation is performed is fed in; a signal input terminal 21a via which a control signal fed from the microcomputer 2 to drive and control a loading motor 4 is fed in; signal input terminals 21b to 21e via which control signals fed from the DSP 3 to drive and control a focus coil 5, a tracking coil 6, a sled motor 7, and a spindle motor 8, respectively, are fed in; and amplifiers 22a to 22e that receive at their respective inverting input terminals the control signals fed in via the signal input terminals 21a to 21e.

The driver IC 1 is further provided with: a loading driver 23a for driving and controlling the loading motor 4 on the basis of the output of the amplifier 22a; a focus driver 23b for controlling the current fed to the focus coil 5 on the basis of the output of the amplifier 22b; a tracking driver 23c for controlling the current fed to the tracking coil 6 on the basis of the output of the amplifier 22c; a sled driver 23d for driving and controlling the sled motor 7 on the basis of the output of the amplifier 22d; and a spindle driver 23e for driving and controlling the spindle motor 8 on the basis of the output of the amplifier 22e.

In this driver IC 1, the amplifier 22a receives at its non-inverting input terminal, as a reference voltage, a bias voltage fed in via the bias terminal 20a from the microcomputer 2, and the amplifiers 22b to 22e receive at their non-inverting input terminals, as a reference voltage, a bias voltage fed in via the bias terminal 20b from the DSP 3.

With the driver IC 1 configured as described above, when an instruction for a loading operation, such as swapping or ejection of the disk 11, is fed to the microcomputer 2, the microcomputer 2 outputs a control signal for the loading operation and feeds a bias voltage. The driver IC 1 then receives via the bias terminal 20a the bias voltage from the microcomputer 2, and receives via the signal input terminal 21a the control signal from the microcomputer 2. At this time, the DSP 3 is kept in a halted state, and therefore the DSP 3 does not output control signals, nor does it feed a bias voltage. Thus, no bias voltage is fed to the bias terminal 20b, and no control signals are fed to the signal input terminals 21b to 21e.

With the bias voltage fed only to the bias terminal 20a and the control signal fed only to the signal input terminal 21a in this way, the amplifier 22a amplifies the control signal fed in via the signal input terminal 21a by using as a reference voltage the bias voltage fed in via the bias terminal 20a. Then, on the basis of the control signal amplified by the amplifier 22a, the loading driver 23a operates to drive and control the loading motor 4 so as to perform the loading operation.

By contrast, when an instruction for a recording or reproducing operation is fed to the microcomputer 2, the microcomputer 2 controls the DSP 3 so that it operates. Thus, the DSP 3 starts to operate, and feeds a bias voltage to the bias terminal 20b of the driver IC 1, while the light reflected from the disk 11 is received and converted into a data signal by the optical pickup 10 and is then fed, in the form of the data signal, to the RF amplifier 9. The RF amplifier 9 produces from the data signal fed from the optical pickup 10 thereto a tracking error signal and a focus error signal, which are then fed to the DSP 3. On the other hand, the microcomputer 2 stops feeding the bias voltage to the bias terminal 20a and stops outputting the control signal to the signal input terminal 21a.

Then, on the basis of the tracking error signal and the focus error signal, the DSP 3 produces control signals for the focus coil 5, tracking coil 6, sled motor 7, and spindle motor 8, respectively, and outputs them to the signal input terminals 21b to 21e. Thus, the amplifiers 22b to 22e amplify the control signals fed in via the signal input terminals 21b to 21e by using as a bias voltage the bias voltage fed in via the bias terminal 20b.

Then, on the basis of the control signals amplified by the amplifiers 22b to 22e, the focus driver 23b, tracking driver 23c, sled driver 23d, and spindle driver 23e individually operate to drive and control the focus coil 5, tracking coil 6, sled motor 7, and spindle motor 8, respectively. Through this sequence of operations, in a reproducing or recording operation, the laser light from the optical pickup 10 can be shone on the target track on the disk 11.

With the configuration described above, during a loading operation, the operation of the DSP 3 can be kept halted. This helps to reduce the power consumption by the DSP 3.

Second Embodiment

Figure 2:
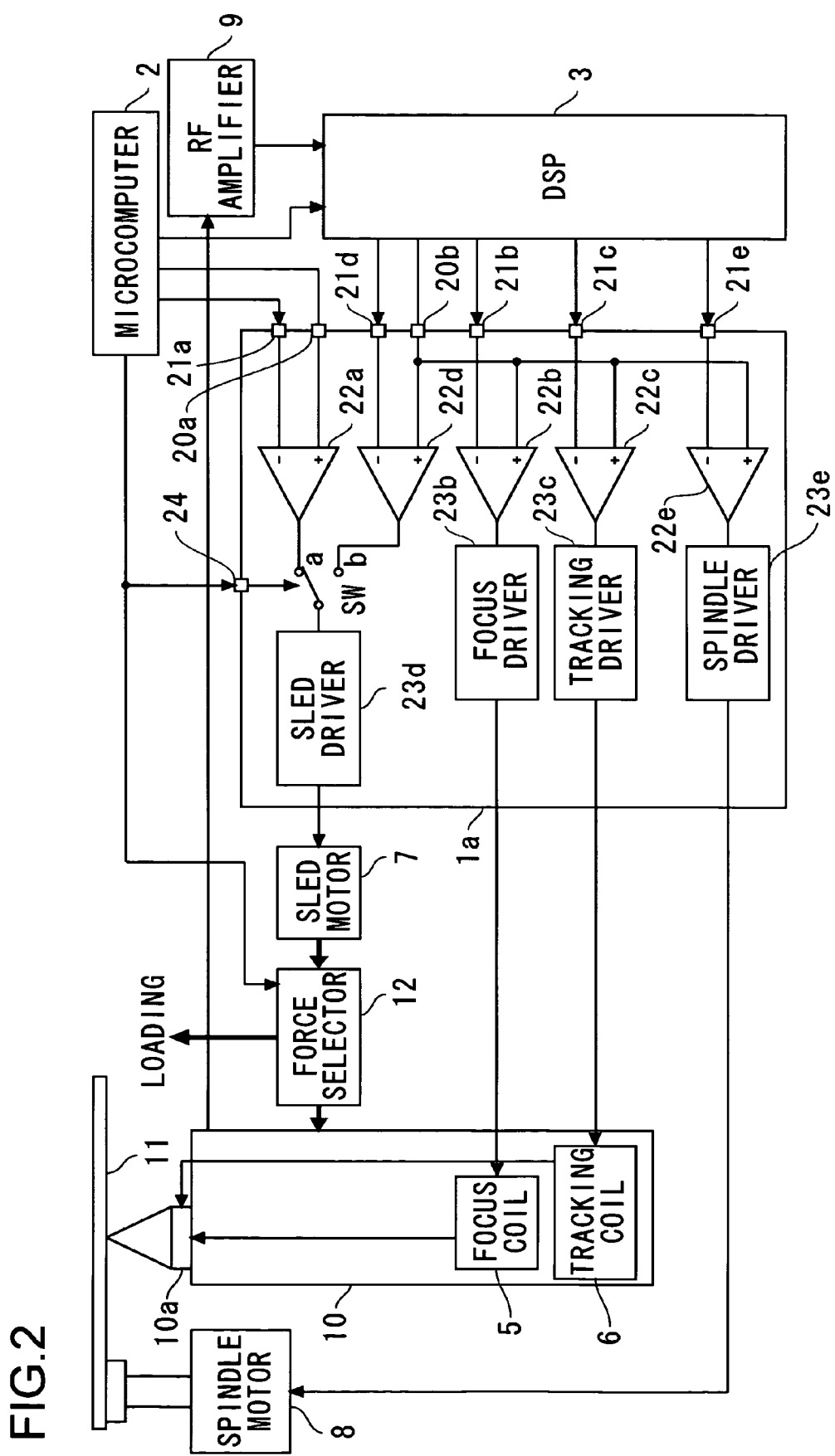
FIG. 2 is a block diagram showing an example of the internal configuration of an optical disk apparatus provided with the driver IC of a second embodiment of the invention.

A second embodiment of the present invention will be described below with reference to the drawings. FIG. 2 is a block diagram showing the internal configuration of the optical disk apparatus of this embodiment. In the optical disk apparatus shown in FIG. 2, such components as are found also in the optical disk apparatus shown in FIG. 1 are identified with the same reference numerals.

The optical disk apparatus shown in FIG. 2 differs from that shown in FIG. 1 in that the sled motor 7 is shared as the motor for a loading operation, and accordingly that the loading motor 4 shown in FIG. 1 is omitted here. Correspondingly, this optical disk apparatus is provided with a driver IC 1a, which differs from the driver IC 1 shown in FIG. 1 in that the loading driver 23a is omitted and in that a selector switch SW for selecting one of the outputs of the amplifiers 22a and 22d and feeding it to the sled driver 23d is additionally provided. The selector switch SW receives from the microcomputer 2 a selection control signal by which the switching between the different contacts of the selector switch SW is controlled. Accordingly, the driver IC 1a is further provided with a control terminal 24 via which this selection control signal is fed in.

Moreover, the optical disk apparatus shown in FIG. 2 is provided with a force selector 12 for choosing whether to transmit the driving force from the sled motor 7 to the loading mechanism or to the moving mechanism for the optical pickup 10. The selection control signal from the microcomputer 2 is also fed to the force selector 12 to determine whether to transmit the driving force from the sled motor 7 to the moving mechanism for the optical pickup 10 or to the loading mechanism.

With the driver IC 1a configured as described above, when an instruction for a loading operation is fed to the microcomputer 2, as in the first embodiment, the microcomputer 2 feeds a bias voltage and a control signal to the bias terminal 20a and the signal input terminal 21a, respectively, of the driver IC 1a. At this time, the DSP 3 is kept in a halted state, and therefore the DSP 3 does not output control signals, nor does it feed a bias voltage. Moreover, the selection control signal instructs the force selector 12 to transmit the driving force of the sled motor 7 to the loading mechanism so that the loading mechanism operates. Furthermore, the selection control signal fed from the microcomputer 2 to the control terminal 24 of the driver IC 1a causes the selector switch SW to be switched to the contact "a" so that the output of the amplifier 22a is connected to the input of the sled driver 23d.

With the bias voltage fed only to the bias terminal 20a and the control signal fed only to the signal input terminal 21a in this way, on the basis of the control signal amplified by the amplifier 22a, the sled driver 23d operates to drive and control the sled motor 7. At this time, the driving force of the sled motor 7 is transmitted to the loading mechanism, and thus the loading mechanism operates to perform a loading operation.

By contrast, when an instruction for a recording or reproducing operation is fed to the microcomputer 2, the microcomputer 2 controls the DSP 3 so that it operates. Moreover, the selection control signal instructs the force selector 12 to transmit the driving force of the sled motor 7 to the moving mechanism for the optical pickup 10 so that the sled motor 7 moves the optical pickup 10. Furthermore, the selection control signal fed from the microcomputer 2 to the control terminal 24 of the driver IC 1a causes the selector switch SW to be switched to the contact "b" so that the output of the amplifier 22d is connected to the input of the sled driver 23d.

Then, as in the first embodiment, the DSP 3 starts to operate. Thus, the DSP 3 feeds a bias voltage to the bias terminal 20b of the driver IC 1a, and produces, on the basis of the tracking error signal and the focus error signal from the RF amplifier 9, control signals for the focus coil 5, tracking coil 6, sled motor 7, and spindle motor 8, respectively, to output them to the signal input terminals 21b to 21e.

Thus, the amplifiers 22b to 22e amplify the control signals fed in via the signal input terminals 21b to 21e by using as a bias voltage the bias voltage fed in via the bias terminal 20b, and then feed them to the focus driver 23b, tracking driver 23c, sled driver 23d, and spindle driver 23e, respectively. As a result, as in the first embodiment, the focus coil 5, tracking coil 6, sled motor 7, and spindle motor 8 are driven and controlled so that the laser light from the optical pickup 10 is shone on the target track on the disk 11.

With the configuration described above, during a loading operation, the operation of the DSP 3 can be kept halted. This helps to reduce the power consumption by the DSP 3. Moreover, a loading operation can be performed with the sled motor. This helps to minimize an optical disk apparatus provided with this driver IC.

Figure 3:
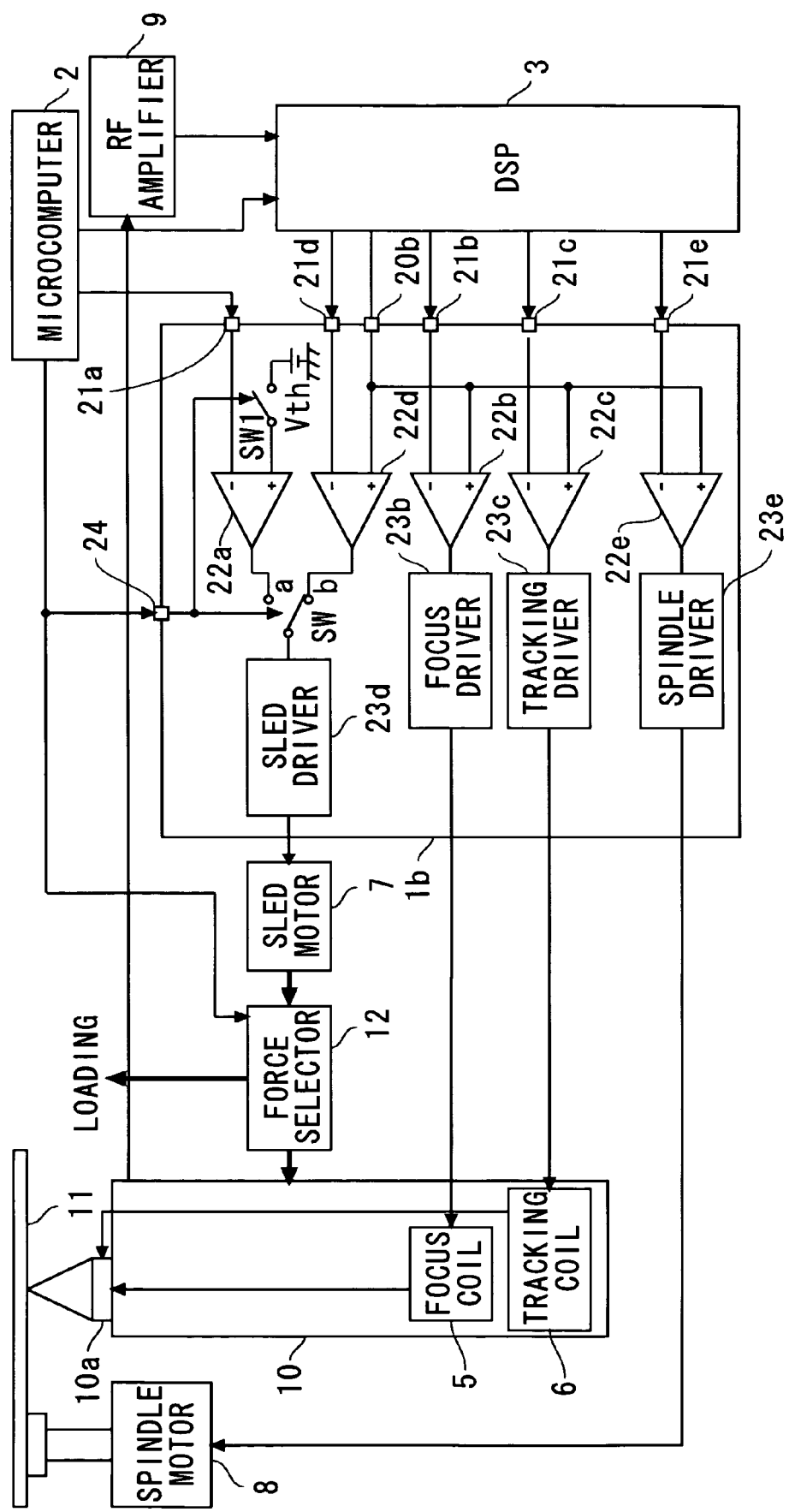
FIG. 3 is a block diagram showing another example of the internal configuration of an optical disk apparatus provided with the driver IC of a second embodiment of the invention.

In this embodiment, as a reference voltage that is used for the amplifier 22a during a loading operation, the bias voltage fed from the microcomputer 2 is used. Instead, as shown in FIG. 3, an internal reference voltage Vth may be produced within a driver IC 1b. In this case, in the driver IC 1b, the bias terminal 20a shown in FIGS. 1 and 2 is omitted, and a switch SW1 for choosing whether or not to feed the internal reference voltage Vth to the non-inverting input terminal of the amplifier 22a is additionally provided. When a loading operation is performed, the selection control signal fed from the microcomputer 2 in via the control terminal 24 causes the switch SW1 to be turned on so that the internal reference voltage Vth is fed to the amplifier 22a. By contrast, when no loading operation is performed, the selection control signal causes the switch SW1 to be turned off so that the feeding of the internal reference voltage Vth to the amplifier 22a is stopped.

In this embodiment, the sled motor is used to feed a driving force to the loading mechanism during a loading operation. Instead, it is also possible to use the spindle motor 8 to feed a driving force for a loading operation. In this case, the selector switch SW selects one of the outputs of the amplifiers 22a and 22e to feed it to the spindle driver 23e. Moreover, the force selector 12 chooses whether to transmit the driving force of the spindle motor 8 to the loading mechanism or to the moving mechanism for the optical pickup 10.

The descriptions given hereinbefore deal only with optical disk apparatuses. However, needless to say, similar configurations can be adopted in disk apparatuses of any other type, such as magnetic disk apparatuses.

According to the present invention, in a disk apparatus, a first and a second bias input terminal are separately provided via which a bias voltage is fed to a loading controller and another to a data position specifying controller. The first bias terminal receives the bias voltage from a main controller, and the second bias input terminal receives the bias voltage from a signal processor. Accordingly, when a loading operation is performed, the signal processor can be kept in a halted state. This helps to reduce the power consumption by the disk apparatus. Moreover, a driver performs control of driving in such a way that a motor used in a data position specifying mechanism is shared by a loading mechanism. This helps to minimize the disk apparatus.

What is claimed is:

1. A disk apparatus comprising:
   a loading mechanism for transporting a disk having data stored thereon to a predetermined position;
   a data position specifying mechanism for specifying a data position in the data stored on the disk;
   a signal processor for processing a signal to control the data position specifying mechanism;
   a main controller for controlling operation of the apparatus as a whole; and
   a driver comprising:
      a loading controller for driving and controlling the loading mechanism;
      a data position specifying controller for driving and controlling the data position specifying mechanism;
      a first bias input terminal via which a bias voltage for operating the loading controller is fed in;
      a first signal input terminal via which a control signal fed from the main controller to the loading controller is fed in;
      a second bias input terminal via which a bias voltage for operating the data position specifying controller is fed in; and
      a second signal input terminal via which a control signal fed from the signal processor to the data position specifying controller is fed in,
   wherein, when a loading operation is performed by operating the loading mechanism, whereas the main controller feeds the bias voltage to the first bias input terminal, operation of the signal processor is halted.

2. A disk apparatus as claimed in claim 1,
   wherein the data position specifying mechanism is an optical pickup, and
   wherein the data position specifying controller includes at least one of
      a focus driver for driving and controlling a focus coil for moving an objective lens of the optical pickup in a direction perpendicular to a disk surface of the disk;
      a tracking driver for driving and controlling a tracking coil for moving the objective lens in a direction radial to the disk;
      a sled driver for driving and controlling a sled motor for indirectly moving the optical pickup in a direction radial to the disk; and
      a spindle driver for driving and controlling a spindle motor for rotating the disk in a direction circumferential thereto.

3. A disk apparatus as claimed in claim 2,
   wherein the loading controller includes a loading driver for driving and controlling a loading motor included in the loading mechanism, the loading controller being fed with the control signal via the first signal input terminal.

4. A disk apparatus as claimed in claim 3,
   wherein the loading controller includes a first amplifier for amplifying the control signal fed to the loading driver,
   wherein the data position specifying controller includes a second amplifier for amplifying the control signal fed to the at least one of the drivers included in the data position specifying controller, and
   wherein the first amplifier receives as a reference voltage the bias voltage fed in via the first bias terminal, and the second amplifier receives as a reference voltage the bias voltage fed in via the second bias terminal.

* * * * *